(12) United States Patent
Bhat et al.

(10) Patent No.: US 11,681,944 B2
(45) Date of Patent: Jun. 20, 2023

(54) SYSTEM AND METHOD TO GENERATE A LABELED DATASET FOR TRAINING AN ENTITY DETECTION SYSTEM

(71) Applicant: Oracle International Corporation, Redwood Shores, CA (US)

(72) Inventors: Shrihari Amarendra Bhat, Belmont, CA (US); Sameer Arun Joshi, San Jose, CA (US); Ravi Ranjan, Bangalore (IN); Samarjeet Singh Tomar, Bangalore (IN); Harendra Kumar Mishra, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1191 days.

(21) Appl. No.: 16/100,029

(22) Filed: Aug. 9, 2018

(65) Prior Publication Data
US 2020/0050662 A1    Feb. 13, 2020

(51) Int. Cl.
*G06F 40/295* (2020.01)
*G06N 20/00* (2019.01)
(Continued)

(52) U.S. Cl.
CPC ........... *G06N 20/00* (2019.01); *G06F 18/211* (2023.01); *G06F 18/2155* (2023.01); *G06F 18/23* (2023.01); *G06F 40/295* (2020.01)

(58) Field of Classification Search
CPC .... G06F 40/295; G06N 20/00; G06K 9/6228; G06K 9/6259
(Continued)

(56) References Cited

U.S. PATENT DOCUMENTS 5,832,511 A    11/1998   Beck et al.
6,725,262 B1    4/2004   Choquier et al.
(Continued)

FOREIGN PATENT DOCUMENTS

CN         1352768 A    6/2002
CN       101267352 B    5/2011
(Continued)

OTHER PUBLICATIONS

Selamat et al. ("Arabic Script Web Document Language Identifications Using Neural Network" iiWAS, 2007, pp. 329-338) (Year:2007).
(Continued)

*Primary Examiner* — Jeffery A Williams
(74) *Attorney, Agent, or Firm* — Invoke

(57) ABSTRACT

"Semi-supervised" machine learning relies on less human input than a supervised algorithm to train a machine learning algorithm to perform entity recognition (NER). Starting with a known entity value or known pattern value for a specific entity type, phrases in a training data corpus are identified that include the known entity value. Context-value patterns are generated to match selected phrases that include the known entity value. One or more context-value patterns may be validated based on human input. The validated patterns identify additional entity values. A subset of the additional entity values may also be validated based on human input. Occurrences of validated entity values may be labeled in the training corpus. Sample phrases from the labeled training dataset may be extracted to form a reduced-size training set for a supervised machine learning model which may be further used in production to label data for any named entity recognition application.

36 Claims, 6 Drawing Sheets

(51) Int. Cl.
*G06K 9/62* (2022.01)
*G06F 18/23* (2023.01)
*G06F 18/211* (2023.01)
*G06F 18/214* (2023.01)

(58) Field of Classification Search
USPC .......................................................... 706/12
See application file for complete search history.

(56) References Cited

U.S. PATENT DOCUMENTS

| | | | |
|---|---|---|---|
| 6,738,911 B2 | 5/2004 | Hayes | |
| 6,910,183 B2 | 6/2005 | Maier et al. | |
| 7,111,075 B2 | 9/2006 | Pankovcin et al. | |
| 7,155,514 B1 | 12/2006 | Milford | |
| 7,523,433 B1 | 4/2009 | Anderson | |
| 7,653,633 B2 | 1/2010 | Villella et al. | |
| 7,822,850 B1 | 10/2010 | Brikman et al. | |
| 7,844,999 B1 | 11/2010 | Aguilar-Macias et al. | |
| 8,041,683 B1 | 10/2011 | Korolev et al. | |
| 8,612,377 B2 | 12/2013 | Beg et al. | |
| 8,620,928 B1 | 12/2013 | Walton | |
| 8,832,125 B2 | 9/2014 | Boctor | |
| 9,092,625 B1 | 7/2015 | Kashyap et al. | |
| 9,262,519 B1 | 2/2016 | Saurabh et al. | |
| 9,292,328 B2 | 3/2016 | Pratt et al. | |
| 2002/0138762 A1 | 9/2002 | Horne | |
| 2003/0061025 A1* | 3/2003 | Abir | G06F 40/289 704/7 |
| 2004/0254919 A1 | 12/2004 | Giuseppini | |
| 2004/0261055 A1 | 12/2004 | Bertelrud et al. | |
| 2005/0027858 A1 | 2/2005 | Sloth et al. | |
| 2005/0044075 A1 | 2/2005 | Steere et al. | |
| 2005/0228885 A1 | 10/2005 | Winfield et al. | |
| 2006/0136177 A1 | 6/2006 | Patanian | |
| 2006/0195297 A1 | 8/2006 | Kubota et al. | |
| 2006/0195731 A1 | 8/2006 | Patterson et al. | |
| 2006/0214963 A1 | 9/2006 | Komatsu | |
| 2008/0005265 A1 | 1/2008 | Miettinen et al. | |
| 2008/0155103 A1 | 6/2008 | Bailey | |
| 2008/0215546 A1 | 9/2008 | Baum et al. | |
| 2009/0089252 A1 | 4/2009 | Galitsky et al. | |
| 2009/0119307 A1 | 5/2009 | Braun et al. | |
| 2009/0249250 A1 | 10/2009 | Gajula et al. | |
| 2010/0115010 A1 | 5/2010 | Anderson et al. | |
| 2011/0246826 A1 | 10/2011 | Hsieh et al. | |
| 2012/0005542 A1 | 1/2012 | Petersen et al. | |
| 2012/0072381 A1* | 3/2012 | Cao | G06F 40/00 706/12 |
| 2012/0117079 A1 | 5/2012 | Baum et al. | |
| 2012/0124047 A1 | 5/2012 | Hubbard | |
| 2012/0278872 A1 | 11/2012 | Woelfel et al. | |
| 2013/0042147 A1 | 2/2013 | Tonouchi | |
| 2013/0054402 A1 | 2/2013 | Asherman et al. | |
| 2013/0227352 A1 | 8/2013 | Kumarasamy et al. | |
| 2013/0282739 A1 | 10/2013 | Anderson et al. | |
| 2014/0089744 A1 | 3/2014 | Oshiro | |
| 2014/0157370 A1 | 6/2014 | Plattner et al. | |
| 2014/0289428 A1 | 9/2014 | Walter et al. | |
| 2014/0304197 A1 | 10/2014 | Jaiswal et al. | |
| 2015/0149480 A1 | 5/2015 | Swan et al. | |
| 2015/0154192 A1 | 6/2015 | Lysne et al. | |
| 2015/0293920 A1 | 10/2015 | Kanjirathinkal et al. | |
| 2015/0379052 A1 | 12/2015 | Agarwal et al. | |
| 2016/0019286 A1 | 1/2016 | Bach et al. | |
| 2016/0034510 A1 | 2/2016 | Gukal | |
| 2016/0041894 A1 | 2/2016 | Reid et al. | |
| 2016/0092427 A1 | 3/2016 | Bittmann | |
| 2016/0092558 A1 | 3/2016 | Ago et al. | |
| 2016/0099953 A1 | 4/2016 | Hebert et al. | |
| 2016/0224570 A1 | 8/2016 | Sharp et al. | |
| 2016/0246849 A1 | 8/2016 | Frampton et al. | |
| 2016/0247205 A1 | 8/2016 | Ziliacus et al. | |
| 2016/0253425 A1 | 9/2016 | Stoops et al. | |
| 2016/0292263 A1 | 10/2016 | Ferrar | |
| 2016/0292592 A1 | 10/2016 | Patthak et al. | |
| 2016/0371363 A1 | 12/2016 | Muro et al. | |
| 2017/0344625 A1* | 11/2017 | Hosokawa | G06F 16/288 |

FOREIGN PATENT DOCUMENTS

| | | |
|---|---|---|
| CN | 102164050 A | 8/2011 |
| CN | 103412924 A | 11/2013 |
| CN | 105138593 A | 12/2015 |
| WO | 2012/031259 A1 | 3/2012 |

OTHER PUBLICATIONS

"Log monitoring/analysis" May 13, 2014, 4 pages http://ossec-docs.readthedocs.org/en/latest/manual/monitoring/.

DataDOG Docs, "Log Parsing in the Agent", Jul. 20, 2013, 3 pages http://docs.datadoghq.com/guides/logs/.

Gamuts Software, "Log File Parsers", Mar. 5, 2015, 1 page http://www.gamutsoftware.com/index.php/help/logfileconfiguration/.

Han et al("Centroid-Based Document Classification: Analysis and Experimental Results", In: Zighed D.A., Komorowski J., Zytkow J. (eds) Principles of Data Mining and Knowledge Discovery. PKDD 2000. Lecture Notes in Computer Science, vol. 1910. Springer, 2000, pp. 1-8) (Year:200).

Hongyong Yu, et al., "Mass log data processing and mining based on Hadoop and cloud computing" Computer Science & Education (ICCSE), 2010, 7th International Conference ON, IEEE, Jul. 14, 2012, pp. 197-202,XP032232566.

Li, Weixi "Automatic Log Analysis Using Machine Learning: Awesome Automatic Log Analysis Version 2.0", Uppsala Universitet, Nov. 2013. (Year: 2013).

Logentries, "Tags and Alerts", Jul. 6, 2015, 5 pages https://logentries.com/doc/setup-tags-alerts/.

Loggly, "Automated Parsing Log Types", Support Center, Apr. 8, 2015, 15 pages https://wvw.loagly.com/docs/automated-parsing/.

Loggly, "Tag Your Sources for More Focused Searching" Sep. 26, 2015, 5 pages https://www.loggly.com/blog/log-management-tags-searching/.

Loggly, "Tags", Support Center, Apr. 30, 2015, 5 pages https://www.loggly.com/docs/tags/.

Meiyappan Nagappan, et al., "Abstracting log lines to log event types for mining software system logs", Mining Software Repositories (MSR), 2010, 7th IEEE Working Conference ON, IEEE, Piscataway, NJ, USA May 2, 2010, pp. 114-117, XP031675571.

Ning et al. ("HLAer: a System for Heterogeneous Log Analysis", "HLAer: a System for Heterogeneous Log Analysis," in SDM Workshop on Heterogeneous Machine Learning, 2014, pp. 1-22) (Year: 2014).

Scalyr, "Parsing Logs", Apr. 19, 2015, 9 pages https://www.scalyr.com/help/parsing-logs/.

School of Haskell, "Parsing Log Files in Haskell", Feb. 1, 2015, 22 pages.

T. G. Dietterich ("Ensemble methods in machine learning", In Multiple Classifier System, Springer, pp., 1-15, 2000) (Year: 2000).

William LAM, "How to Add a Tag (Log prefix) to Syslog Entries", May 7, 2013, 4 pages.

Xu et al. ("Detecting Large-Scale System Problems by Mining Console Logs", SOSP 09, Oct. 11-14, 2009, pp. 117-131) (Year: 2009).

Towards Automated Log Parsing for Large-Scale Log Data Analysis Pinjia He;Jieming Zhu;Shilin He; Jian Li;Michael R. Lyu IEEE Transactions on Dependable and Secure Computing, 933-944 (Year: 2019).

Hayta et al. ("Language Identification Based on N-Gram Feature Extraction Method by Using Classifiers", IU-JEEE vol. 13(2), 2013, pp. 1-10) (Year: 2013).

Malmasi et al. ("NLI Shared Task 2013: MQ Submission", Proceedings of the Eighth Workshop on Innovative Use of NLP for Building Educational Applications, pp. 124-133, Atlanta, Georgia, Jun. 13, 2013) (Year: 2013).

Marco Lui ("Generalized Language Identification", PHD Thesis, Department of Computing and Information Systems, The University of Melbourne, Jul. 2014, pp. 1-326).

(56) References Cited

OTHER PUBLICATIONS

Cohn et al., "Audio De-identification: A New Entity Recognition Task," NAACL-HLT, 2019, 8 pages.

Cumby et al., "A Machine Learning Based System for Semi-Automatically Redacting Documents," Proceedings of the Twenty-Third Innovative Applications of Artificial Intelligence Conference, 2011, pp. 1628-1635.

Demoncourt et al., "De-identification of patient notes with recurrent neural networks," Journal of the American Medical Informatics Association, JAMIA, vol. 24, No. 3, 2016, pp. 596-606.

Irmak et al., "A Scalable Machine-Learning Approach for Semi-Structured Named Entity Recognition," WWW '10 Proceedings of the 19th international conference on World wide web, Apr. 26-30, 2010, pp. 461-470.

Liu et al., "De-identification of clinical notes via recurrent neural network and conditional random field," Journal of Biomedical Informatics, vol. 75, 2017, pp. S34-S42.

Mamou et al., "Term Set Expansion based NLP Architect by Intel AI Lab," Proceedings of the 2018 Conference on Empirical Methods in Natural Language Processing (System Demonstrations), 2018, pp. 19-24.

Qiu et al., "Learning Word Representation Considering Proximity and Ambiguity," AAAI'14 Proceedings of the Twenty-Eighth AAAI Conference on Artificial Intelligence, 2014, pp. 1572-1578.

Sahlgren et al., "Learning Representations for Detecting Abusive Language," Proceedings of the Second Workshop on Abusive Language Online (ALW2), 2018, pp. 115-123.

Shin et al., "Electronic Medical Records privacy preservation through k-anonymity clustering method," The 6th International Conference on Soft Computing and Intelligent Systems, and the 13th International Symposium on Advanced Intelligence Systems, 2012, 1119-1124.

Yarowsky algorithm, Wikipedia, https://en.wikipedia.org/wiki/Yarowsky_algorithm, retrieved on Sep. 12, 2018.

Trevino, Introduction to K-means Clustering, https://www.datascience.com/blog/k-means-clustering, Jun. 12, 2016.

Tf-Idf, Wikipedia, https://en.wikipedia.org/wiki/Tf-idf, retrieved on Aug. 9, 2018.

F1 score, Wikipedia, https://en.wikipedia.org/wiki/F1_score, retrieved on Aug. 2, 2018.

\* cited by examiner

400

```
┌─────────────────────────────────────────────────────────────┐
│ Find phrases in the training data corpus that include a seed value. │
│                             410                             │
└─────────────────────────────────────────────────────────────┘
                              │
                              ▼
┌─────────────────────────────────────────────────────────────┐
│  Cluster phrases, and select a phrase to represent each cluster. │
│                             420                             │
└─────────────────────────────────────────────────────────────┘
                              │
                              ▼
┌─────────────────────────────────────────────────────────────┐
│ Generate a context-value pattern for each cluster representative │
│              phrase based on human input.                   │
│                             430                             │
└─────────────────────────────────────────────────────────────┘
```

SYSTEM AND METHOD TO GENERATE A LABELED DATASET FOR TRAINING AN ENTITY DETECTION SYSTEM

TECHNICAL FIELD

The present disclosure relates to named entity recognition (NER). More specifically, the disclosure relates to a semi-supervised algorithm for labeling a training data corpus used to train a machine learning model.

BACKGROUND

Machine learning algorithms that perform named entity recognition (NER) use supervised algorithms that work very well and produce high accuracy results. However, supervised algorithms need to be trained on a labeled dataset created by human experts. Human experts create the dataset by manually labeling words in a training data corpus which belong to specific entity type. The current industry procedure to label new data sets for supervised learning for the NER problem is to employ humans (e.g. using Amazon Mechanical Turk) to manually label various entities using some known samples as a guideline.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 is a flow diagram that illustrates generating and validating context-value patterns from a training data corpus, in accordance with one or more embodiments;

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

Some embodiments include labeling entities, within a training data corpus, with a corresponding entity type. A training data corpus with labeled entities may be used, for example, to train an entity recognition system. Entities corresponding to a particular entity type may be identified using a seed value of that particular entity type. Specifically, the recitations of the seed value within the training data corpus are analyzed to determine context-value patterns for the citations of the seed value. Other values, within the training data corpus, recited with corresponding contexts that match the same context-value patterns as the recitations of the seed value, are identified as entities of the same entity type as the seed value. One or more of the identified values may be used as seed values in an iterative process for identifying a next set of values corresponding to the same entity type.

Figure 1:
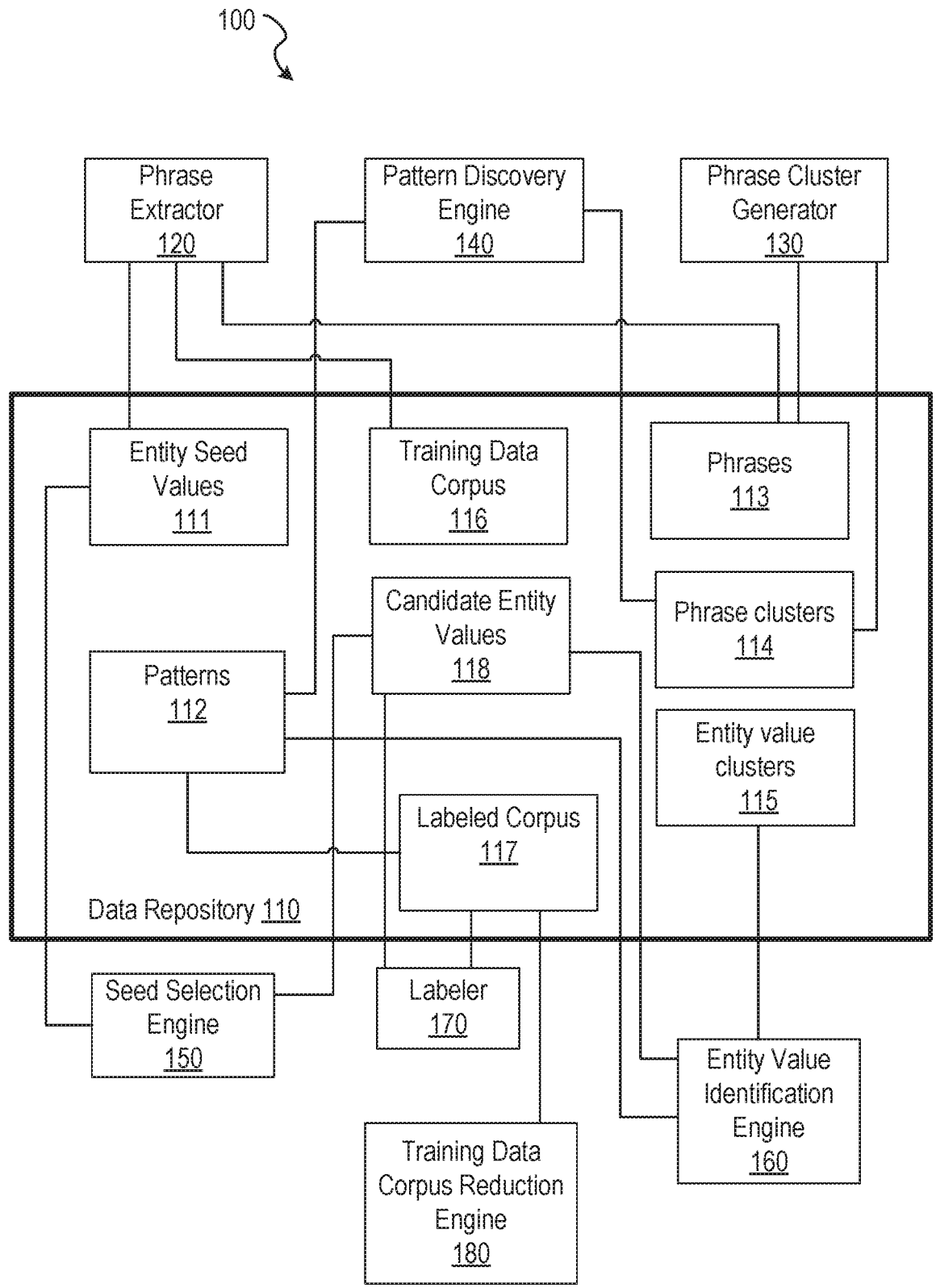
FIG. 1 is a block diagram that illustrates components of the system, in accordance with one or more embodiments.

Some embodiments described in this Specification and/or recited in the claims may not be included in this General Overview section. 2. PROCESS OVERVIEW One or more embodiments include a two-stage procedure for named entity recognition (NER). The first stage is a semi-supervised algorithm executed using the components (100) as illustrated in FIG. 1, and further described below. The semi-supervised algorithm is used for labeling a training data corpus (also referred to as the "training dataset"). "Semi-supervised" is used herein to mean that automated portions of the labeling process reduce the amount of work needed by a human supervisor. An automated process relies on machine learning techniques to identify words in the training dataset that might be values of a particular entity type. Some of the entity values identified by the automated process are presented to a human expert for validation input. "Candidate value" is used herein to mean one or more sequential words ("entities") in the training dataset that the system identifies as potential values of an entity type, but which have not yet been validated. For example, if an entity type is "city", entities that appear in the training dataset such as "San Francisco", "Chicago", and "New York" may be suggested as being of the entity type "city". The system proposes candidate values in the training dataset to a human for providing input to determine which are correct or incorrect examples of a particular entity type. Using the human expert's validation, the validated words may be labeled within the training dataset with the corresponding entity type. The labeled training dataset can further be used for training by standard algorithms for named entity recognition. This will ensure higher accuracy and minimal supervision.

Figure 2:
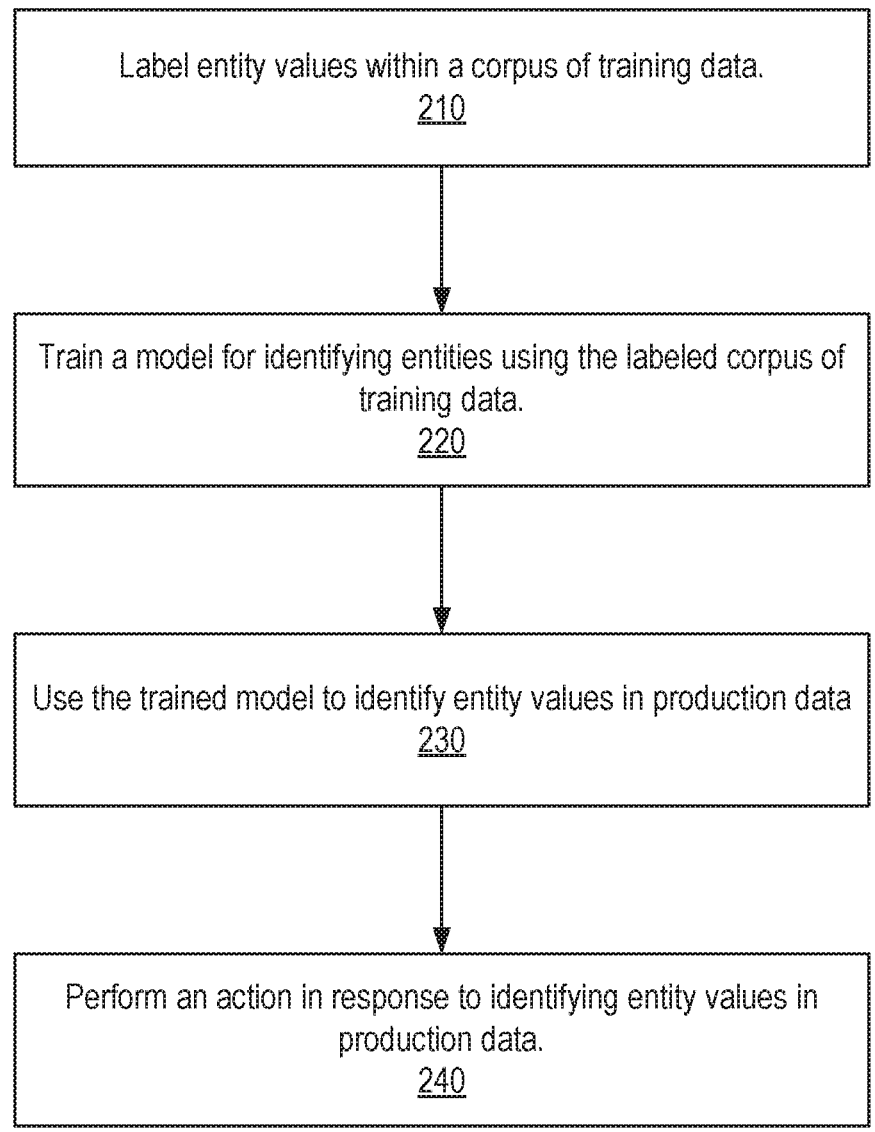
FIG. 2 is a flow diagram that illustrates the context for using the techniques disclosed herein are used, in accordance with one or more embodiments.

FIG. 2 is a flow diagram that illustrates the context for using the techniques disclosed herein, in accordance with one or more embodiments. An example of an application that might use NER is one that extracts information from resumes. An employer may use an application for storing job applicant data according to a schema. It is advantageous to have a tool that can extract information of interest, such as university name, previous employer(s), and special skills, from semi structured text like resumes.

Operation 210 performs semi-supervised learning to produce a labeled training dataset that needs minimal human interaction. A set of entity types of interest is defined. Examples of interesting entity types might be for example, first name, last name, previous employer(s), academic institution name. The process described herein is performed for each entity type independent of other entity types. The process is initiated with one or more values that are examples of an entity type, referred to herein as a "seed value." For example, the process may be initiated by identifying "Oracle" as a seed value for the entity type <company>. Matching "Oracle" in a phrase such as "Experience: Oracle Corporation for 5 years" may lead to a context pattern such as "Experience: <company>" or "<company> Corporation" or "<company> for <number> years".

Applying these patterns to a training corpus of resumes may match phrases that include other candidate company names. These other company names may be proposed as values of the same entity type "company" to a human expert. The human expert may review a sample of the proposed values and indicate which values of the sample correspond to the entity type. Validated instances of the entity values may be annotated in the training dataset to indicate the entity type. Operation 210 is described in more detail with respect to FIGS. 3, 4, and 5.

Operation 220 uses the labeled training dataset produced by Operation 210 as input to a machine learning model.

In Operation 230, the model may be applied to "real" data to identify entities of a particular type. The "real" data as used herein is data that is distinct from the testing or training dataset and upon which the final model will be applied to perform an action. For example, resumes may be received on an on-going basis from job seekers, and the model may be applied to newly received resumes. In an embodiment, Operation 230 may label the entities identified in the real data for later processing. Alternatively, Operation 230 may only locate entity values in the real data and Operation 240 may be interleaved to act on the identified entities at the time the entities are identified.

Operation 240 performs an action in response to locating identified entity values in the real data. For example, Operation 240 may extract all such words that are determined to be of particular entity type. Alternatively, the identified words may be highlighted, bolded, italicized. In another embodiment, Operation 240 may not change the real data, but rather perform some other action such as send an email to a subscriber or system administrator.

3. Semi-Supervised NER Architecture

FIG. 1 is a block diagram that illustrates components of the system for performing Operation 210, in accordance with one or more embodiments. The system comprises a Data Repository 110 and a set of executable modules.

Data repository 110 stores data that is input to and/or output from executable modules of the system. Data repository 110 stores at least Entity Seed Values 111, Training Data Corpus 116, Phrases 113, Phrase Clusters 114, Patterns 112, Candidate Entity Values 118, and Labeled Corpus 117.

In one or more embodiments, a data repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site.

Entity Seed Values 111 comprises a set of valid entity values for a particular entity type. A seed value is an example value for an entity type and may comprise one or more words. In an embodiment, seed values may be supplied by a human. In an alternate embodiment, seed values may be identified from the training dataset when at least one context-value pattern is known a priori (for example, the format of a resume is already known). If the entity type is flowers, the set of seed values may include "daisy". "iris", and "lily". These examples are used to discover context within the training dataset in which these entities occur. The context may include words or phrases before and/or after the seed entity value.

The Training Data Corpus 116 is a sample set of documents having a representative structure of the set of real documents on which an action may be performed by the model derived using the labeled training dataset, as discussed for Operation 240. Ideally, the training data corpus includes all examples of context in which values of a particular entity type may be found in the real data. To be most accurate, the training dataset needs to be large enough to provide entity value examples in a variety of contexts but may not need to be as large as the set of real documents.

Phrases 113 identifies a set of phrases in the training data corpus 116 that provides context for an entity value. A phrase is a group of two or more words that express a single idea, and need not be a grammatically complete sentence. As used herein, a phrase is a sequence of words that includes a known correct or candidate entity value in addition to terms that occur before and/or after the entity value. An example of a phrase is a sentence that is defined as words between two punctuation marks such as newlines, commans, semi-colons, or periods.

A phrase is also referred to herein as a "citation." A term is a word in the training dataset that provides context for an entity value. A prefix and/or a suffix may comprise one or more terms. For example, if an entity type is "city", and the sentence "San Francisco is located on the west coast of the United States" occurs in the training data corpus 116, then "San Francisco is located on" is a phrase comprising a city name "San Francisco" followed by a suffix comprising the terms "is located on."

A phrase may be identified by copying the text of the phrase into phrases 113. Alternatively, a phrase may be identified by the phrase's location within the training dataset, such as a start and end location or a start location and length.

Information about phrase clusters is stored in Phrase clusters 114. Phrases identified in the training corpus are partitioned into clusters. A phrase cluster is a grouping of phrases in the training dataset that are more similar to each other based on some criteria than other phrases placed in other clusters. More generally, phrases having the same or similar terms around the entity value may be grouped together.

Information about a phrase cluster may include the phrases assigned to the cluster, an indication of the representative phrase for the cluster, and information used to select a representative phrase. For example, when phrase cluster generator uses a phrase cluster centroid to select the representative phrase, the distance measurements determined between pairs of phrases in the cluster may be stored in phrase clusters 114.

Patterns 112 stores sets of context-value patterns. A context-value pattern is a pattern that provides context for an entity value. A pattern has a format that comprises a prefix specification, an entity value indicator, and a suffix specification, in which the prefix or suffix may be empty. A context-value pattern may be expressed in any syntax understood by a pattern matching function to identify an entity value in the context of other surrounding terms. For example, a context-value pattern may comprise a regular expression. For purposes of example, the syntax of a pattern used herein is expressed as "<prefix> <entity type value> <suffix>" in which the <prefix> matches one or more terms in the corpus that appear immediately preceding an entity value, the <suffix> matches one or more terms that appear immediately after the entity values, and <entity type value> matches one or more sequential words that together comprise a value of a particular entity type. For example, the phrase "San Francisco is located on the west coast of the United States" in the training corpus would be matched by a pattern "<city> is located on", which would identify "San Francisco" as a potential value of "city" in the training dataset.

Candidate Entity Values 118 comprises entity values discovered by matching patterns stored in patterns 112 against the training dataset. Some of the entity values discovered will be correct (valid) entity values for the entity type, and some entity value are incorrect (invalid) entity values. Also, candidate entity values 118 may include one or more sequential words known or proposed to be related to a validated entity value in the training dataset. The related one or more sequential words need not match any pattern in patterns 112.

In an embodiment, the candidate entity values 118 may associate one or more of the following information with each entity value: the entity type, an indication of an entity value cluster to which the entity value is assigned, whether the entity value was selected as a representative of the cluster, whether the entity value was presented to a human for validation input, and whether the value has been validated (i.e. the value is a correct example of the entity type) or is an incorrect value for the entity type. In addition, candidate entity values 118 may include an indication of how the entity value came to be included in the candidate entity values 118. For example, information about the origins of an entity value may include identification of (a) pattern(s) that matched the phrase(s) in which the entity value was discovered, inclusion in the same cluster as a validated cluster representative, or one or more sequential words in the training dataset related to a validated entity value.

Candidate entity values may also include entity values that are proposed based on relatedness to another candidate entity value or to a seed value. For example, "San Jose" and "Monterey" that are known to be related to "San Francisco" may be valid entity values as well, even if "San Jose" and "Monterey" appear within phrases that are not matched by any context-value pattern. In this example, "San Jose" and "Monterey" may be stored as candidate entity values along with "San Francisco."

Information about entity value clusters is stored in Entity Value Clusters 115. Entity value clusters 115 may include entity values assigned to a cluster, an indication of the representative entity value for a cluster, and information used to select the representative entity value. For example, when an entity value centroid is selected as the representative entity value, the distance measurements determined between pairs of entity values in the cluster may be stored in entity value clusters 115.

Labeled Corpus 117 is the training dataset with annotations indicating entity types of certain one or more sequences of words. An annotation of an entity value may be represented in a variety of ways. For example, text may be inserted into the training data before or after an entity value. The inserted text may be surrounded by special characters (e.g. San Francisco [city] is on the west coast. Another example of an annotation may be a number inserted into the text before or after an entity value, the number being an index into a table of entity types. Alternatively, labeling a training data corpus may not comprise changing the training dataset at all, but rather creating an index of locations within the training dataset where values of an entity type occur.

The set of executable modules includes Phrase Extractor 120, Pattern Discovery Engine 140. Phrase Cluster Generator 130. Entity Value Identification Engine 160. Seed Selection Engine 150, Labeler 170, and Training Data Corpus Reduction Engine 180.

Phrase Extractor 120 searches for occurrences within the training dataset of entities in Entity Seed Values 111. Upon finding an occurrence of a seed value, phrase extractor 120 extracts a phrase that includes the seed value. Identification of the phrases extracted by the phrase extractor 120 are stored in phrases 113.

Phrase Cluster Generator 130 creates clusters of the phrases stored in phrases 113. Phrases placed in the same cluster may have a similar structure, such as having a matching prefix or suffix. Any known means of forming clusters may be used. For example, phrase cluster generator 130 may use a k-means cluster-forming algorithm with a configurable value for k, which is the number of clusters to form. Experimentation, prior to running the system, may help determine an optimal value for k. Alternatively, a hierarchical clustering algorithm can be used to avoid specifying the number of clusters. Cluster information may be stored in Phrase Clusters 114.

A clustering algorithm that clusters phrases uses a distance measure between phrases. In an embodiment, a phrase vector is computed for each phrase, and a distance measure is determined based on the phrase vectors. A phrase vector may be computed by aggregating the word vectors for some set of words in a phrase. For example, word vectors for words in the phrase may be added together, and each entry in the resulting vector may be divided by the number of word vectors added. The distance between phrase vectors may be used to identify a phrase to represent all phrases assigned to the same cluster. In an embodiment, the cluster representative phrase may be a phrase cluster centroid. For each phrase, an aggregation of the distances with each other phrase in the cluster may be determined. Examples of aggregating distances include averaging (taking the mean), the mode, or the median distance value. The phrase with the smallest aggregate distance value may be selected as the representative phrase. In another embodiment, the representative phrase may be selected randomly from the cluster. In an embodiment, a phrase vector may be computed using a term frequency-inverse document frequency (tf-idf), which is a numerical statistic indicating the importance of a word in a particular context. For more information, see Appendix A ("What does tf-idf mean?"). This vector is then clustered using any of standard clustering algorithms like k-means. For more information, see Appendix B (Introduction to K means).

Pattern Discovery Engine 140 generates a context-value pattern that matches a phrase extracted from the training dataset. In general, pattern discovery engine 140 can generate a pattern to match any phrase that includes a seed entity value, the generated pattern having a number of words in the phrase before and after the included entity value. In an embodiment, the number of words before and after the included entity value may be configured. In an alternate embodiment, the number of words before and after the included entity value may be based on human input. In an embodiment, pattern discovery engine 140 generates a context-value pattern for each phrase that has been selected to represent a cluster (the representative phrases may be retrieved from phrase clusters 114). The pattern discovery engine 140 stores the generated context-value patterns in the patterns 112.

Entity Value Identification Engine 160 identifies entity values occurring in the training dataset. The entity value identification engine 160 extracts an entity value from phrases in the training dataset based on a context-value pattern stored in patterns 112. For each selected context-value pattern, the entity value is extracted from each of the training dataset phrases that match the context-value pattern. In an embodiment, all context-value patterns may be used to identify entity values. In an alternate embodiment, a subset of context-value patterns may be selected for use in identifying entity values. The entity value identification engine 160 stores the extracted entity values in Candidate Entity Values 118.

Entity value identification engine 160 may reduce the amount of required human supervision by selecting a subset of the entity values for validation. In an embodiment, selecting a subset comprises clustering the candidate entity values using a clustering algorithm, which may use the same or a different algorithm as for phrase clustering. When k-means is used, the number of clusters k may be configured to a different value for entity value clustering than for phrase clustering. The entity value identification engine selects from each entity value cluster a candidate entity value to represent the cluster. In an embodiment, a centroid candidate entity value may be selected.

Partitioning entity values into clusters and selecting a centroid entity value within each cluster may rely on a distance measurement among entity values. Word embedding may be used to map an entity value to a word vector by any known means of creating word vectors. A distance may be determined between each pair of word vectors, and the distance between a pair of entity values compared with the distance between every other pair. Information about the entity values clusters may be stored in entity value clusters 115.

Seed Selection Engine 150 selects from the newly identified valid entity values in Candidate Entity Values 118 one or more additional values to add to the Entity Seed Values 111. In an embodiment, a configured number of additional seed values may be chosen at random from the validated entity values. In another embodiment, all the newly validated entity values are added. In an embodiment, additional words in the training dataset may be identified as related to one or more validated entity values, and the seed selection engine 150 may add those related entity values as seed values. A word from the training dataset may be considered related to a validated entity value by one or more of a variety of techniques. For example, a word from the training dataset may be known as a synonym of a validated entity value. In addition, one or more sequential words from the training dataset may be considered as related to a validated entity value if the one or more sequential words has a distance from the validated entity value that is less than a configured threshold.

Labeler 170 annotates occurrences in the training dataset of validated entity values in candidate entity values 118. The annotation indicates the respective entity type of each occurrence of an entity value. Although the analysis for one entity type may be performed independent of other entity types, in an embodiment, labeler 170 may label entity values for multiple entity types. Alternatively, labeler 170 may label entity values within the training dataset interleaved with the entity type analysis. Labeler 170 may be executed incrementally, labeling entity values that are validated in a particular iteration of the analysis or those selected as seed values. In an embodiment, the labeler 170 may execute when the analysis for an entity type concludes. Labeler 170 may label all entity values within phrases that match patterns in patterns 112. Labeler 170 may also label entity values in candidate entity values 118 that do not match any pattern. In an embodiment, the labeler may label additional entity values determined to be related to a labeled entity value. Determining relatedness may be performed in a manner such as described for seed selection engine 150.

Training Data Corpus Reduction Engine 180 reduces the size of the annotated training dataset to be used as input to the machine learning process of Operation 220. The labeled corpus 117 includes sets of phrases that have annotations and those that do not. Phrases not containing any annotations may also be added to the training dataset to provide input to the model on phrases which should not be labeled. Phrases not having annotations are useful for identifying words that are not of interest in the training dataset. Training Data Corpus Reduction Engine 180 extracts samples of each type of phrase. For example, a phrase that includes a labeled entity value may be randomly sampled, and the phrase along with a configurable number of lines surrounding the phrase that do not include a labeled entity value may be included in the reduced data corpus. In an embodiment, the number of lines to include may be configured based on the intended size of final dataset. In an alternate embodiment, the number of surrounding lines to include can be configured based on the ratio of labeled phrases to unlabeled phrases to preserve representation of original sample dataset.

The reduced dataset of the extracted samples may be several orders of magnitude smaller than the original training dataset. The machine learning process 220 may operate more efficiently when processing a smaller annotated dataset than when processing a large training dataset. In some cases, the size of the training set can be significantly reduced without a corresponding decrease in accuracy. Thus, the learnings obtained from the analysis performed in Operation 210 may be distilled into a smaller footprint.

4. Labeling Training Data Corpus Flow

Figure 3:
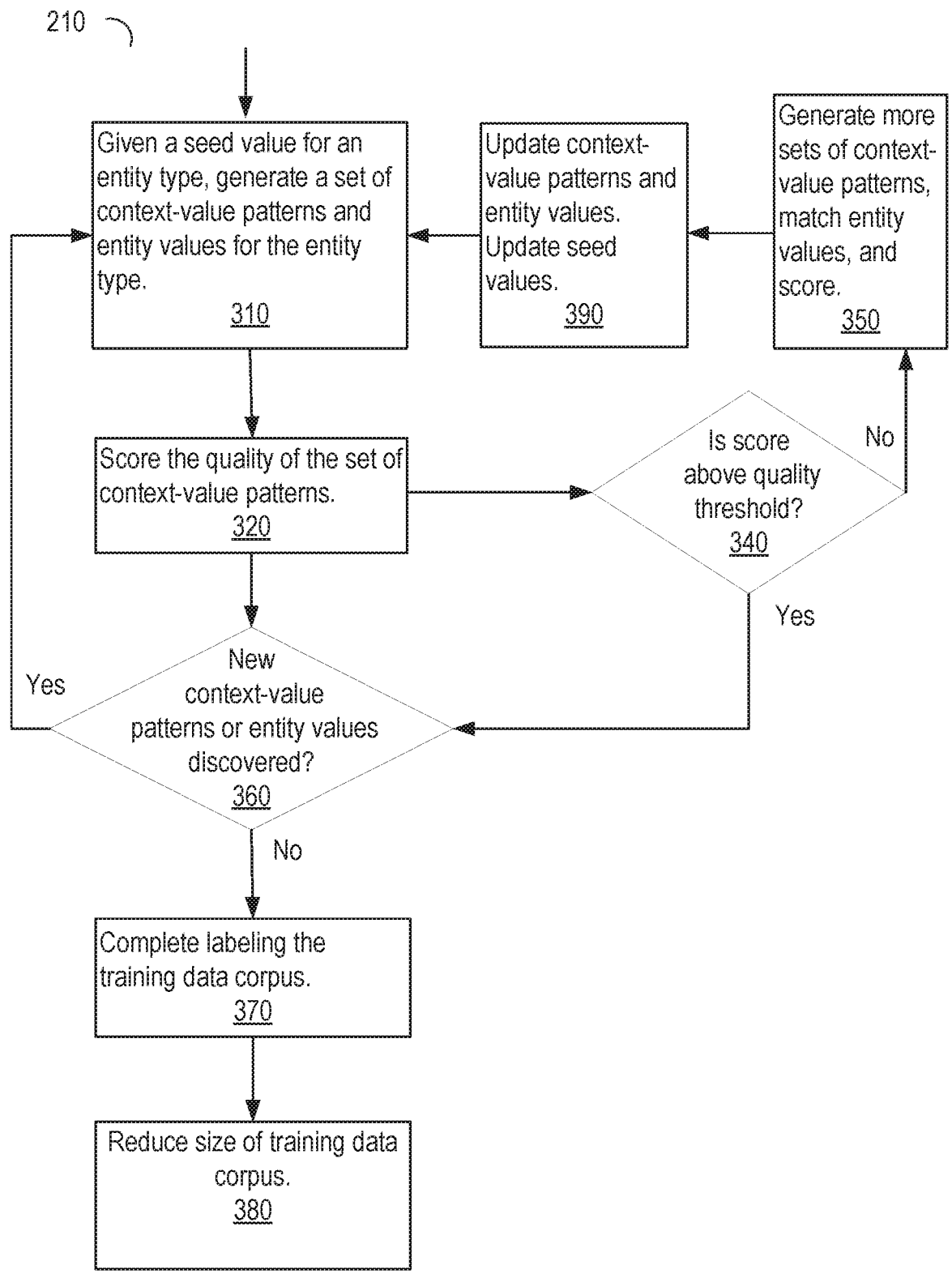
FIG. 3 is a flow diagram that illustrates the overall flow for labeling, within a training data corpus, entity values with an entity type, in accordance with one or more embodiments.

FIG. 3 is a flow diagram that illustrates the overall flow for labeling, within a training data corpus, entity values with an entity type, in accordance with one or more embodiments. The flow illustrates a set of operations that are executed iteratively for performing Operation 210. At the end of each iteration, a set of context-value patterns is added to a set of context-value patterns collected across iterations. The flow begins with generating a set of context-value patterns and a set of entity values for an entity type based on one or more seed values (Operation 310). Operation 310 is described in more detail with respect to FIGS. 4 and 5. Multiple iterations of Operation 310 may be performed, with each iteration adding new context-value patterns, correct entity values, and incorrect entity values to a current set of context-value patterns and entity values. The accuracy of the current set of patterns may be evaluated at the end of an iteration (Operation 320). If the accuracy is not sufficient (Operation 340) then the context-value patterns are fine-tuned and a new set of entity values are obtained based on the updated context value patterns (Operation 350). The best-scoring set of context-value patterns and corresponding entity values may be selected to be added to the set of context value-patterns collected across iterations (Operation 390) No more iterations are performed when, in operation 360, an iteration adds no new patterns or entity values not already collected in previous iterations. When iteration stops, the valid entity values in the training data corpus may be labeled with the entity type (Operation 370). The labeled training data corpus may then be reduced in size by selecting representative excerpts that may be used by the NER machine learning model without sacrificing accuracy.

More detail on Operations 320, 340, 350, 360, 370, 380, and 390 are provided in the sections below.

a. Generating Context-Value Patterns

FIG. 4 is a flow diagram that illustrates generating and validating context-value patterns from a training dataset, in accordance with one or more embodiments. The flow 400 comprises a portion of the operations for performing Operation 210.

Operation 410 includes receiving seed values from entity seed values 111. As explained earlier, the entity seed values 111 may include one or more seed values provided by a human at the start of the flow. During subsequent iterations of the flow 210, entity seed values 111 may include additional values in the training dataset that are automatically identified by the analysis and validated directly or indirectly by a human. Operation 410 further includes executing phrase extractor 120 to identify phrases within the training dataset that include occurrences of entity seed values. Operation 410 may store the identification of the discovered phrases in phrases 113

Operation 420 executes phrase cluster generator 130. Phrase cluster generator 130 executes a clustering algorithm that clusters the phrases identified in operation 410. Operation 420 further identifies a representative phrase for each of the clusters.

Operation 430 executes pattern discovery engine 140 to generate a context-value pattern from each of the phrases representing a cluster. In an embodiment, the representative phrases may be displayed to a human who may indicate for each representative phrase the number of terms before and/or after the seed value within the phrase. For example, consider the phrase "The Taj Mahal is situated in <word> in which the seed value has been replaced by <word>). <word> can represent an alphanumeric sequence of characters before the next punctuation such as a comma, a period, or quotation marks. A human may define the appropriate context in this example phrase as 2 terms before the seed value and no terms afterwards. Using that input, a context value-pattern may be created as "situated in"<word>. If a different cluster representative presented to the human is "I live in <word>", the human may indicate 1 word before the seed value, resulting in a context value pattern of "in <word>".

b. Identifying and Validating Entity Values

Figure 5:
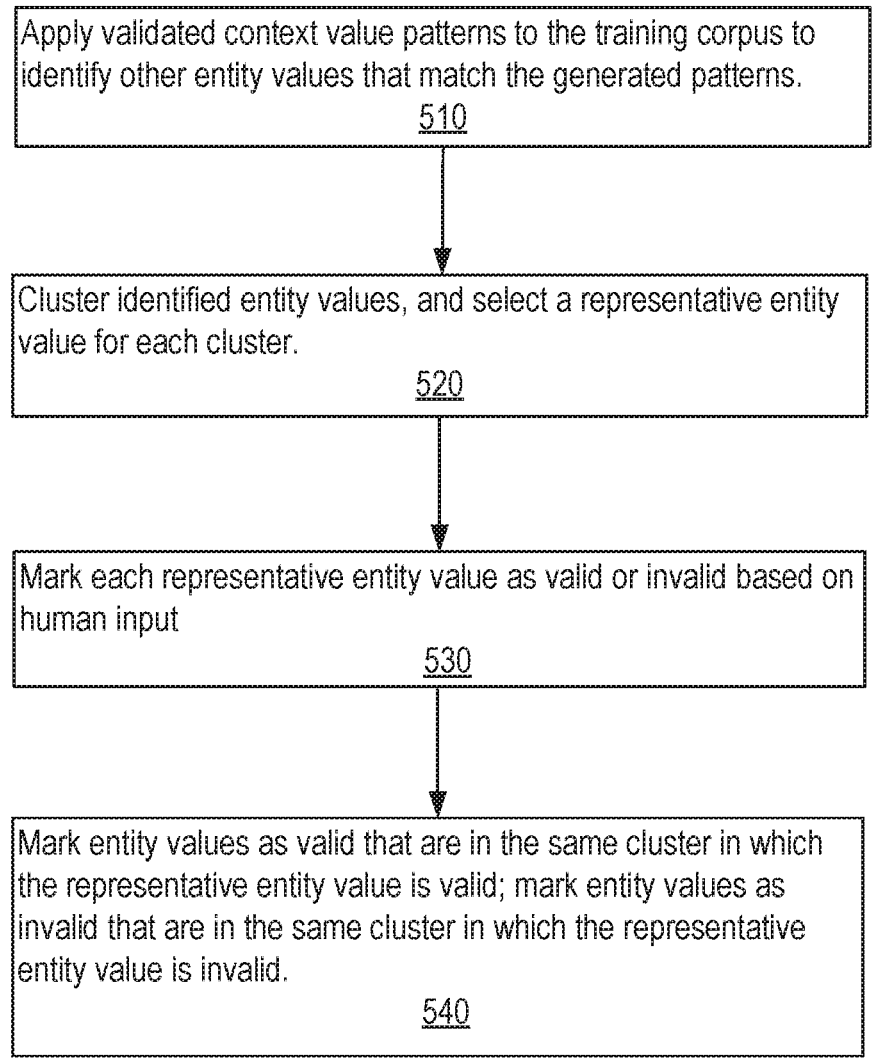
FIG. 5 is a flow diagram that illustrates identifying and validating entity values in the training data corpus, in accordance with one or more embodiments.

FIG. 5 is a flow diagram that illustrates identifying and validating entity values in the training dataset, in accordance with one or more embodiments. Flow 500 takes the valid patterns generated in flow 400 and generates a set of validated entity values found within the training dataset.

In Operation 510, entity value identification engine 160 matches validated patterns in patterns 112 against the training dataset to identify phrases that match a pattern. Entity value identification engine 160 then extracts from the matched phrases the one or more words that match the entity value portion of the matching pattern.

Operation 520 comprises the Entity Value Identification Engine 160 forming clusters of the entity values identified during operation 510. Any means of forming a cluster may be used. For example, k-means clustering creates k clusters where k is an input to the algorithm. As an example, the clustering process may map an entity value to a word vector. The process may randomly select k entity value word vectors as initial cluster centers, then assign each of the remaining entity values to the cluster in which the cluster center word vector is closest to the remaining entity value word vector. In a next iteration, a new cluster center may be selected from among the entity values assigned to each cluster, and the entity values are potentially reassigned clusters based on the distance with the new cluster centers. When there is no change to the cluster center from one iteration to another, the algorithm stops. When the process stops, the entity values that are the cluster centers are selected to represent the cluster.

Operation 530 displays candidate entity values to a human and receives feedback on correct and incorrect values. A correct value is an appropriate value for the entity type. For example, continuing with an earlier example of a pattern for matching a city, a phrase in the training dataset "My brother is on the west coast." This phrase matches a pattern "<entity type value> is on". Thus "brother" would be identified as a candidate entity value. However, the pattern was intended to identify values of entity type "city." "brother" is not a city. Thus, "brother" would be identified as an incorrect entity value.

In an embodiment, before newly identified entity values are displayed to a human for validation, the new values may be compared against values considered to be valid or invalid from prior iterations. In some cases, an entity value may be determined to be valid or invalid based on direct input from a human; that is, the human was presented with the entity value and provided input that the value is valid or invalid. In other cases, values considered to be valid or invalid are those related to a directly validated value, such as values assigned to the same cluster as a directly validated cluster representative. If a candidate value is already found in the list of valid or invalid entity values, the entity value is disregarded as a duplicate, and only entity values not seen before may be presented to a human. In an embodiment, the human affirmatively indicates which values are correct and which values are incorrect. In an embodiment, the human affirmatively selects those values that are correct, and the unselected values are inferred to be incorrect. In an alternate embodiment, the human affirmatively selects those values that are incorrect, and the unselected values are inferred to be correct. All values assigned to the same cluster as an incorrect value may also be considered incorrect. Incorrect values may be stored in the candidate entity values 118 as words to avoid labeling or using as subsequent seed values.

Operation 540 comprises marking each of the entity values in a cluster with the same status as its representative entity value. That is, the entity values in clusters for which the representative entity value is valid are also marked as valid. The entity values in clusters for which the representative entity value is invalid are also marked as invalid. In an embodiment, the system may receive from a human additional entity values from the training dataset that were not identified by the set of context-value patterns.

c. Fine Tuning

As explained above, if the current set of context-value patterns and entity values produced by Operation 310 have an accuracy that is not greater than a threshold, fining tuning of the set of context-value patterns may be needed. To determine whether or not fine tuning is needed, the current set of context-value patterns is scored based on the feedback received from a human on the cluster representative entity values discovered by the patterns (Operation 320). In an embodiment, an F1 score (also called a F-score or F-measure) used in statistical analysis, may be used as a measure of the accuracy of the set of context-value patterns. For more information, see Appendix C (F1 Score).

A score is calculated based at least on the current number of entity values marked as valid (also referred to as a true positive) and the number marked as invalid (also referred to as a false positive). In an embodiment, the score may be compared to a predetermined accuracy threshold. For example, if the best score is 1 and the worst score is 0, an accuracy threshold may be 0.7. In an embodiment, the threshold may be determined by previous experimentation or may be determined by statistical methods. For example, multiple sets of labeled training data may be generated, each using a different threshold value. A human may evaluate the sets of labeled training data to determine which set is most accurate. The threshold value that resulted in the most accurate set of labeled training data may be selected for ongoing use.

In Operation 340 the score determined for the set of context-value patterns is compared to a pre-determined threshold to determine whether the accuracy of the set of context-value patterns is good enough to use for this iteration or whether fining tuning of the patterns is needed before continuing.

If the score does not meet or exceed the threshold, then at least one additional set of context-value patterns is generated, corresponding entity values are identified, and the additional sets of context-value patterns are scored in Operation 350. In an embodiment, each new context-value pattern in an additional set of context-value patterns is created by expanding the number of words in the prefix and or suffix of a corresponding context-value pattern from the original set. In an embodiment, the amount of additional context added to a new context-value pattern may be configured. In another embodiment, the amount of additional context may be a function of the amount of context used to generate the previous context-value pattern for the representative phrase. In an alternate embodiment, certain of the context-value patterns from the current iteration may be retained in an additional set of context-value patterns and others replaced with a corresponding context-value pattern having expanded context based on the validity or invalidity of entity values that each context-value pattern matched.

For example, in the current iteration, the pattern discovery engine 140 may have generated a context-value pattern that included a prefix of n terms and a suffix of m terms around the entity value. During fine tuning, the pattern discovery engine 140 may generate a corresponding context-value pattern having a prefix of n+1, n+2, n+3, . . . n+w where w is the additional window size to be considered during fine tuning. In an embodiment, the window may be 4. Similarly, a context-value pattern may have a suffix of m+1, m=2, m+3, . . . m+w. In an embodiment, each distinct combination of context comprising prefix length i and suffix length j forms a set of distinct context-value patterns that may each be scored separately.

Each newly generated set of context-value patterns is scored in a manner similar to how the original set of context-value patterns was scored in operation 320. Each newly generated set of context-value patterns is matched against the corpus to identify a set of candidate entity values. As each context is larger than its previous counterparts, no new entity values will be identified. Thus, all entity values that are matched by an expanded context are already known from previous human input to be valid or invalid. Some entity values no longer matched using the expanded context will be valid entity values and some will be invalid entity values. A score is computed for each set of expanded context-value patterns based on the number of correct and incorrect entity values identified by the set of expanded context-value patterns.

In operation 390, the scores for each set of context-value patterns are compared, and the set of context-value patterns with the highest score is selected for use in the next iteration. All other sets of context-value patterns and associated entity values may be discarded. Seed selection engine 150 may be executed to select one or more retained correct entity values to add to the set of seeds to be used in the next iteration. The new iteration restarts at Operation 310 using at least one of the newly added seed values.

In an alternate embodiment, after each additional set of context value patterns is generated, the set is scored before generating another additional set. If the score for the newly generated set context-value patterns meets or exceeds the threshold, then no more additional sets of context-value patterns may be generated, and the newly generated set of context-value patterns is used in the next iteration of flow 210 instead of using the set of context-value patterns generated at Operation 310 during the current iteration. In such an iteration, the additional set is good enough without necessarily being the best but is discovered without the expense of additional computational overhead.

The count of valid and invalid entity values may be retained across iterations, and incremented in a subsequent iteration as newly identified entity values are classified as valid or invalid. In addition, if a new set of context-value patterns was selected in fine tuning, the counts used as input to the F1 score may be adjusted. Specifically, the entity values that were classified as false positive for the better scoring set of context value pattern, but were classified as true positive for the original set of context value patterns, are counted as true negatives and not counted as false positives going into the next iteration.

If the score meets or exceeds the pre-determined accuracy threshold in Operation 340, then Operation 360 determines whether another iteration is needed to add more patterns and entity values. If at least one new context-value pattern or entity value was added to the accumulated set of patterns and entity values, then another iteration is performed.

d. Modifying the Training Dataset

At this point in the flow, the context-value patterns and the entity values established earlier in the flow are used to create input for a fully supervised machine model. The input may comprise modifying the training dataset by annotating entity values and reducing the size of the dataset.

Operation 370 executes labeler 170 to label with the entity type, entity values in the training dataset that match the <entity type value> portion of true positive patterns in the final set of context-value patterns. In an embodiment, additional indirectly determined correct entity values that do not match a correct pattern are also labeled.

In an embodiment, labeler 170 incrementally labels newly discovered correct entity values, and those matching newly validated patterns, at the end of each iteration. In an embodiment, labeler 170 labels the training dataset when no further iterations are to be performed.

In an embodiment, the analysis flow 500 may only label entity values that match a correct context-value pattern, and not label additional terms in the training dataset that are related to the entity values that match a context-value pattern. After the training dataset is labeled based on matching context-value patterns, additional terms may be labeled based on a measure of relatedness with labeled entity values that does not rely on context.

After labeling the training dataset for all entity types is completed, the training data corpus reduction engine 180 may be executed to reduce the size of the dataset without reducing the accuracy of the unsupervised machine learning model (Operation 380).

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements. Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is labeled with a tenant ID. A tenant is permitted access to a particular network resource only if the tenant and the particular network resources are associated with a same tenant ID.

In an embodiment, each tenant is associated with a tenant ID. Each application, implemented by the computer network, is labeled with a tenant ID. Additionally or alternatively, each data structure and/or dataset, stored by the computer network, is labeled with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be labeled with a tenant ID. Only a tenant associated with the corresponding tenant ID may access data of a particular database. As another example, each entry in a database implemented by a multi-tenant computer network may be labeled with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic. ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
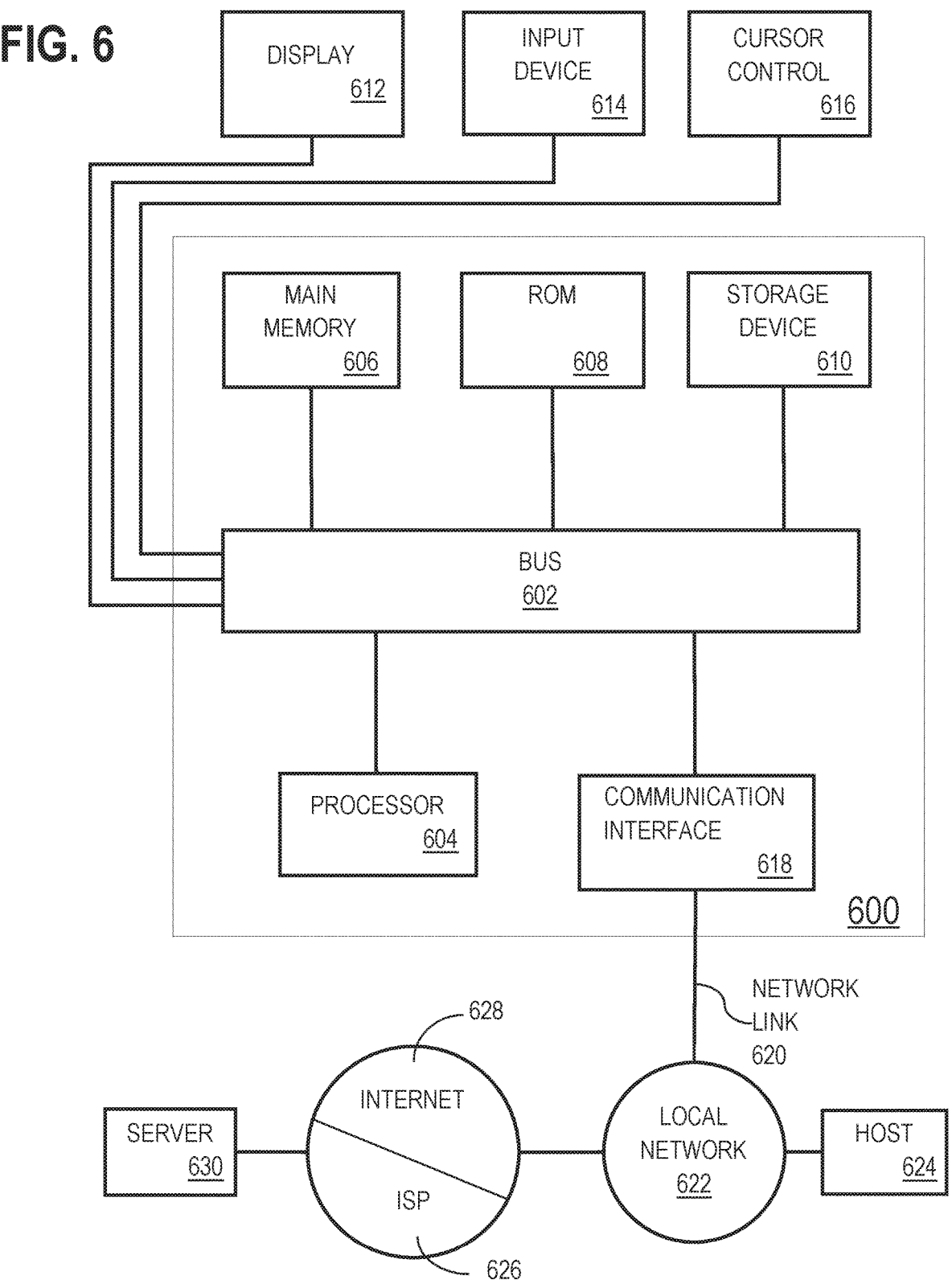
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM. NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   identifying a plurality of citations of a seed value for an entity type in a training data corpus;
   based at least on the plurality of citations of the seed value, determining a context-value pattern for identifying candidate values of the entity type, wherein determining the context-value pattern comprises:
      clustering the plurality of citations into a plurality of citation clusters;
      selecting, for at least one cluster of the plurality of citation clusters, a particular citation as a cluster representative;
      generating the context-value pattern based at least in part on the cluster representative;
   identifying a plurality of candidate values, for the entity type, in the training data corpus based on each of the plurality of candidate values being cited in the training data corpus in accordance with the context-value pattern; and
   labeling at least a subset of the plurality of candidate values with the entity type.

2. The medium of claim 1, wherein the operations further comprise:
   selecting the subset of the plurality of candidate values as a set of seed values for the entity type;
   identifying a second plurality of citations of the set of seed values in the training data corpus;
   determining a plurality of context-value patterns for the second plurality of citations of the set of seed values for the entity type;
   identifying a second plurality of candidate values, for the entity type, in the training data corpus based on each of the second plurality of candidate values being cited in the training data corpus in accordance with one of the plurality of context-value patterns; and labeling at least a subset of the second plurality of candidate values with the entity type.

3. The medium of claim 1, wherein a context-value pattern of the plurality of context-value patterns comprises one or more terms before or after the seed value in a citation that includes the seed value for the entity type.

4. The medium of claim 1, wherein the context-value pattern comprises one or more terms preceding the seed value in the plurality of citations.

5. The medium of claim 1, wherein the context-value pattern comprises one or more terms subsequent to the seed value in the plurality of citations.

6. The medium of claim 1, wherein the context-value pattern comprises the seed value, one or more terms preceding the seed value, and one or more terms subsequent to the seed value.

7. The medium of claim 1, wherein
generating the context-value pattern is further based on input received from a user indicating a number of terms to use for a prefix or suffix.

8. The medium of claim 1, wherein the operations further comprise:
receiving a second seed value for a second entity type;
identifying a second plurality of citations of the second seed value in a training data corpus;
clustering the second plurality of citations into a plurality of citation clusters;
selecting, for at least one cluster of the plurality of citation clusters, a particular citation as the cluster representative;
responsive to receiving user input, refraining from creating a context-value pattern for the particular cluster representative.

9. The medium of claim 1, wherein the operations further comprise:
presenting the cluster representative to a human;
adding the cluster representative to a set of valid entity values or set of invalid entity values based on human input;
refraining from labeling in the training data corpus any candidate value in a cluster represented by an entity value in the set of invalid entity values.

10. The medium of claim 9, wherein the operations further comprise:
assigning a first score to a first set of context-value patterns based at least on (a) the number of entity values in the set of valid entity values and (b) the number of entity values in the set of invalid entity values.

11. The medium of claim 10, wherein the operations further comprise:
determining, based on the first score, to fine tune the first set of context-value patterns, wherein fine tuning comprises:
assigning a second score to a second set of context-value patterns;
wherein each of the second context-value patterns comprises a prefix having more terms than the prefix of each of the first set of context-value patterns; or
each of the second context-value patterns comprises a suffix having more terms than the suffix of each of the first set of context-value patterns;
determining a better-scoring set of context value patterns based on the first score of the first set context-value patterns and the second score of the second set of context-value patterns; and
adding the better-scoring set of context value patterns to an accumulated set of context-value patterns accumulated across iterations.

12. The medium of claim 9, wherein the operations further comprise:
responsive to determining that a related term in the training data corpus that is not identified by any context-value pattern is related to a valid entity value in the set of valid entity values based on a measure of distance between the related term and entity value, adding the related term to the set of valid entity values.

13. The medium of claim 1, wherein the operations further comprise:
subsequent to labeling at least a subset of the plurality of candidate values with the entity type in the training data corpus, creating a new training data set that is smaller than the training data corpus by extracting from the training data corpus:
a first amount of data in the training data corpus before or after a labeled entity value; and
a second amount of data in the training data corpus, the second amount of data having no labeled entity values; and
using the new training data set to train an entity-labeling machine learning model.

14. The medium of claim 1, wherein the seed value is received as input.

15. The medium of claim 1, wherein:
a context-pattern is received as input; and
the seed value is generated based on the context-pattern.

16. A system comprising:
at least one hardware device including a processor; and
the system configured to perform operations comprising:
identifying a plurality of citations of a seed value for an entity type in a training data corpus;
based at least on the plurality of citations of the seed value, determining a context-value pattern for identifying candidate values of the entity type, wherein determining the context-value pattern comprises:
clustering the plurality of citations into a plurality of citation clusters;
selecting, for at least one cluster of the plurality of citation clusters, a particular citation as a cluster representative;
generating the context-value pattern based at least in part on the cluster representative;
identifying a plurality of candidate values, for the entity type, in the training data corpus based on each of the plurality of candidate values being cited in the training data corpus in accordance with the context-value pattern; and
labeling at least a subset of the plurality of candidate values with the entity type.

17. The system of claim 16, wherein the operations further comprise:
selecting the subset of the plurality of candidate values as a set of seed values for the entity type;
identifying a second plurality of citations of the set of seed values in the training data corpus;
determining a plurality of context-value patterns for the second plurality of citations of the set of seed values for the entity type;
identifying a second plurality of candidate values, for the entity type, in the training data corpus based on each of the second plurality of candidate values being cited in the training data corpus in accordance with one of the plurality of context-value patterns; and labeling at least a subset of the second plurality of candidate values with the entity type.

18. The system of claim 16, wherein determining the context-value pattern:
is based at least in part on user input verifying the context-value pattern.

19. The system of claim 16, the operations further comprising:
presenting the cluster representative to a human;
adding the cluster representative to a set of valid entity values or set of invalid entity values based on human input;
refraining from labeling in the training data corpus any candidate value in a cluster represented by an entity value in the set of invalid entity values.

20. The system of claim 19, the operations further comprising:
responsive to determining that a related term in the training data corpus that is not identified by any context-value pattern is related to a valid entity value in the set of valid entity values based on a measure of distance between the related term and entity value, adding the related term to the set of valid entity values.

21. The system of claim 16, the operations further comprising:
subsequent to labeling at least a subset of the plurality of candidate values with the entity type in the training data corpus, creating a new training data set that is smaller than the training data corpus by extracting from the training data corpus:
a first predetermined amount of data in the training data corpus before or after a labeled entity value; and
a second predetermined amount of data in the training data corpus, the data having no labeled entity values; and
using the new training data set to train an entity-labeling machine learning model.

22. A method comprising:
identifying a plurality of citations of a seed value of an entity type in a training data corpus;
based at least on the plurality of citations of the seed value, determining a context-value pattern for identifying candidate values of the entity type, wherein determining the context-value pattern comprises:
clustering the plurality of citations into a plurality of citation clusters;
selecting, for at least one cluster of the plurality of citation clusters, a particular citation as a cluster representative;
generating the context-value pattern based at least in part on the cluster representative;
identifying a plurality of candidate values, for the entity type, in the training data corpus based on each of the plurality of candidate values being cited in the training data corpus in accordance with the context-value pattern; and
labeling at least a subset of the plurality of candidate values with the entity type.

23. The method of claim 22, wherein the operations further comprise:
selecting the subset of the plurality of candidate values as a set of seed values for the entity type;
identifying a second plurality of citations of the set of seed values in the training data corpus;
determining a plurality of context-value patterns for the second plurality of citations of the set of seed values for the entity type;
identifying a second plurality of candidate values, for the entity type, in the training data corpus based on each of the second plurality of candidate values being cited in the training data corpus in accordance with one of the plurality of context-value patterns; and
labeling at least a subset of the second plurality of candidate values with the entity type.

24. The method of claim 22, wherein a context-value pattern of the plurality of context-value patterns comprises one or more terms before or after the seed value in a citation that includes the seed value for the entity type.

25. The method of claim 22, wherein the context-value pattern comprises one or more terms preceding the seed value in the plurality of citations.

26. The method of claim 22, wherein the context-value pattern comprises one or more terms subsequent to the seed value in the plurality of citations.

27. The method of claim 22, wherein the context-value pattern comprises the seed value, one or more terms preceding the seed value, and one or more terms subsequent to the seed value.

28. The method of claim 22, wherein
generating the context-value pattern is further based on input received from a user indicating a number of terms to use for a prefix or suffix.

29. The method of claim 28, further comprising:
receiving a second seed value for a second entity type;
identifying a second plurality of citations of the second seed value in a training data corpus;
clustering the second plurality of citations into a plurality of citation clusters;
selecting, for at least one cluster of the plurality of citation clusters, a particular citation as the cluster representative;
responsive to receiving user input, refraining from creating a context-value pattern for the particular cluster representative.

30. The method of claim 22, further comprising:
clustering the plurality of candidate values into a plurality of candidate value clusters;
presenting the cluster representative to a human;
adding the cluster representative to a set of valid entity values or set of invalid entity values based on human input;
refraining from labeling in the training data corpus any candidate value in a cluster represented by an entity value in the set of invalid entity values.

31. The method of claim 30, further comprising:
assigning a first score to a first set of context-value patterns based at least on (a) the number of entity values in the set of valid entity values and (b) the number of entity values in the set of invalid entity values.

32. The method of claim 31, further comprising:
determining, based on the first score, to fine tune the first set of context-value patterns, wherein fine tuning comprises:
assigning a second score to a second set of context-value patterns;
wherein each of the second context-value patterns comprises a prefix having more terms than the prefix of each of the first set of context-value patterns; or
each of the second context-value patterns comprises a suffix having more terms than the suffix of each of the first set of context-value patterns;
determining a better-scoring set of context value patterns based on the first score of the first set context-value patterns and the second score of the second set of context-value patterns; and adding the better-scoring set of context value patterns to an accumulated set of context-value patterns accumulated across iterations.

33. The method of claim 30, further comprising:

responsive to determining that a related term in the training data corpus that is not identified by any context-value pattern is related to a valid entity value in the set of valid entity values based on a measure of distance between the related term and entity value, adding the related term to the set of valid entity values.

34. The method of claim 22, further comprising:

subsequent to labeling at least a subset of the plurality of candidate values with the entity type in the training data corpus, creating a new training data set that is smaller than the training data corpus by extracting from the training data corpus:

a first amount of data in the training data corpus before or after a labeled entity value; and a second amount of data in the training data corpus, the second amount of data having no labeled entity values; and using the new training data set to train an entity-labeling machine learning model.

35. The method of claim 22, wherein the seed value is received as input.

36. The method of claim 22, wherein:

a context-pattern is received as input; and the seed value is generated based on the context-pattern.

* * * * *

UNITED STATES PATENT AND TRADEMARK OFFICE
CERTIFICATE OF CORRECTION

PATENT NO. : 11,681,944 B2  
APPLICATION NO. : 16/100029  
DATED : June 20, 2023  
INVENTOR(S) : Bhat et al.

Page 1 of 2

It is certified that error appears in the above-identified patent and that said Letters Patent is hereby corrected as shown below:

On the Title Page

On Page 2, Column 2 (Other Publications), Line 5, Delete "Gamuts Software," and insert -- Gamut Software, --.

On Page 2, Column 2 (Other Publications), Line 11, Delete "(Year:200)." and insert -- (Year:2000). --.

On Page 2, Column 2 (Other Publications), Line 22, Delete "https://wvw.loagly.com/docs/automated-parsing/." and insert -- https://www.loggly.com/docs/automated-parsing/. --.

In the Specification

In Column 2, Line 22, Delete "2. PROCESS OVERVIEW" and insert the same on Column 2, Line 23, as a heading.

In Column 3, Line 66, Delete ""daisy"." and insert -- "daisy", --.

In Column 4, Line 22, Delete "commans," and insert -- commas, --.

In Column 5, Line 61, Delete "coast." and insert -- coast). --.

In Column 6, Line 2, Delete "140." and insert -- 140, --.

In Column 6, Line 3, Delete "130." and insert -- 130, --.

In Column 6, Line 3, Delete "160." and insert -- 160, --.

In Column 9, Line 22, After "113" insert -- . --.

Signed and Sealed this  
Eighth Day of October, 2024

Katherine Kelly Vidal  
*Director of the United States Patent and Trademark Office*

CERTIFICATE OF CORRECTION (continued)
U.S. Pat. No. 11,681,944 B2

In Column 9, Line 34, Delete ""The Taj Mahal" and insert -- "The Taj Mahal" --.

In Column 9, Line 43, Delete "I" and insert -- 1 --.

In Column 11, Line 25, Delete "and or" and insert -- and/or --.

In Column 11, Line 46, Delete "m=2," and insert -- m+2, --.

In Column 17, Line 6, Delete "FLASH-EPROM." and insert -- FLASH-EPROM, --.

In the Claims

In Column 21, Line 4, In Claim 18, delete "pattern:" and insert -- pattern --.